United States Patent [19]

Carle et al.

[11] 4,040,523
[45] Aug. 9, 1977

[54] RAILWAY CAR CUSHIONING DEVICE

[75] Inventors: Ross G. Carle; James R. Reinhardt, both of Houston, Tex.

[73] Assignee: ACF Industries, Incorporated, New York, N.Y.

[21] Appl. No.: 663,400

[22] Filed: Mar. 3, 1976

[51] Int. Cl.² ............................................. B61G 9/08
[52] U.S. Cl. ............................... 213/46 R; 188/282; 213/43; 213/223
[58] Field of Search ....................... 213/8, 43, 46, 223; 267/65 R; 188/282, 317

[56] References Cited

U.S. PATENT DOCUMENTS

| 1,434,024 | 10/1922 | Ree | 213/43 X |
| 3,596,773 | 8/1971 | Peterson | 188/282 X |
| 3,596,774 | 8/1971 | MacCurdy | 213/43 X |
| 3,731,771 | 5/1973 | Borgo | 213/43 X |
| 3,826,343 | 7/1974 | Heymann | 188/282 |

Primary Examiner—Drayton E. Hoffman
Assistant Examiner—Fred A. Silverberg
Attorney, Agent, or Firm—Eugene N. Riddle

[57] ABSTRACT

An end-of-car hydraulic pneumatic cushioning device for connecting to the coupler of a railway car having a piston mounted within a cylinder and a piston rod secured to the piston extending rearwardly from the cylinder. The piston divides the cylinder into a front high pressure chamber and a rear low pressure chamber, and a gaseous and liquid fluid mixture is provided in both the high and low pressure chambers. The piston carries normally closed metering valves which open in buff travel a buff flow passage between the low and high pressure chambers after around two inches or more of buff travel from neutral extended position, and open upon return draft travel after buff travel a restricted draft flow passage between the low and high pressure chambers. The gas in the fluid mixture particularly upon high velocity impact loads is dispersed throughout the liquid and thus has a large contact area with the liquid to minimize the increase in temperature of the gas upon being compressed.

6 Claims, 11 Drawing Figures

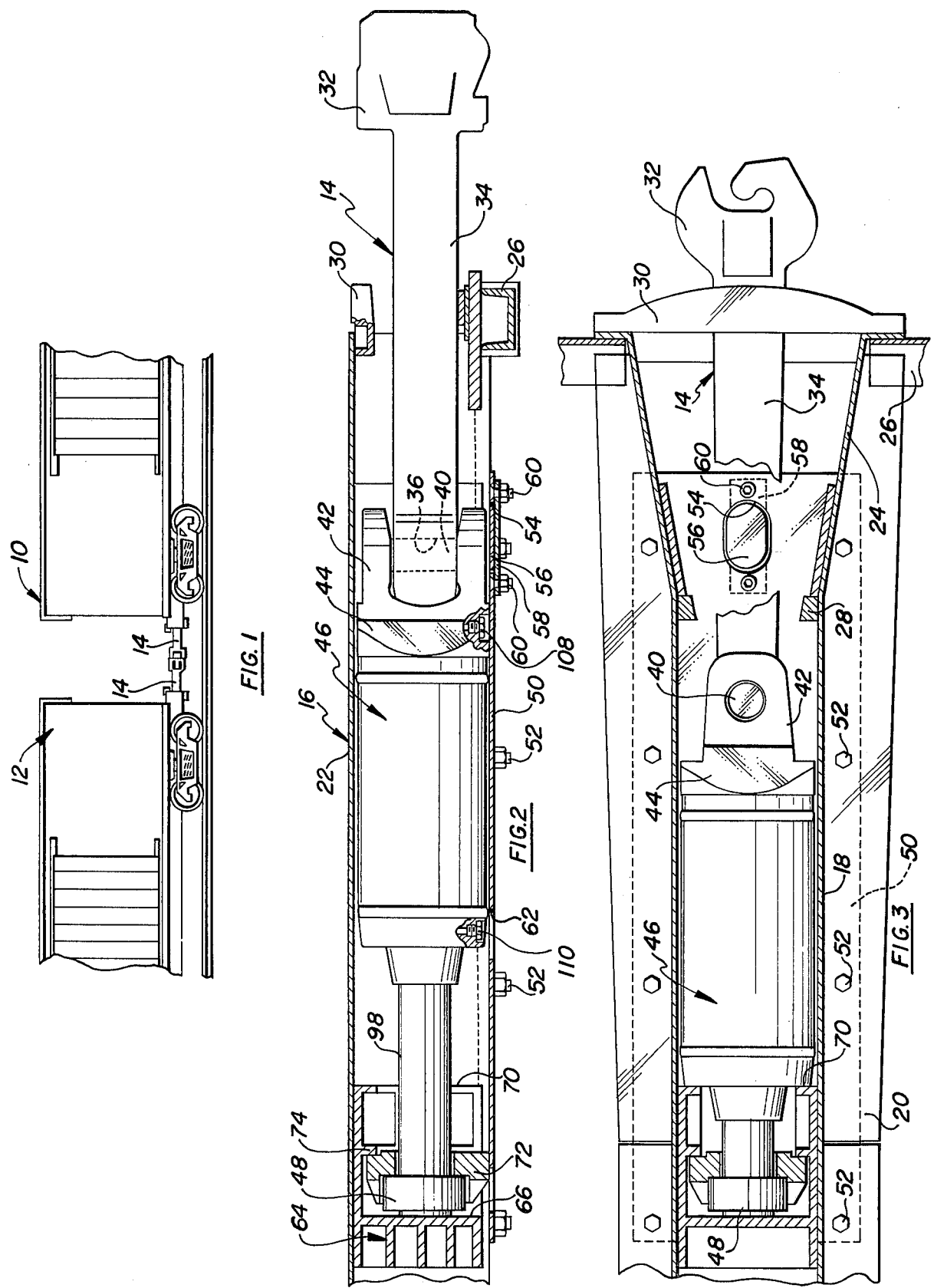

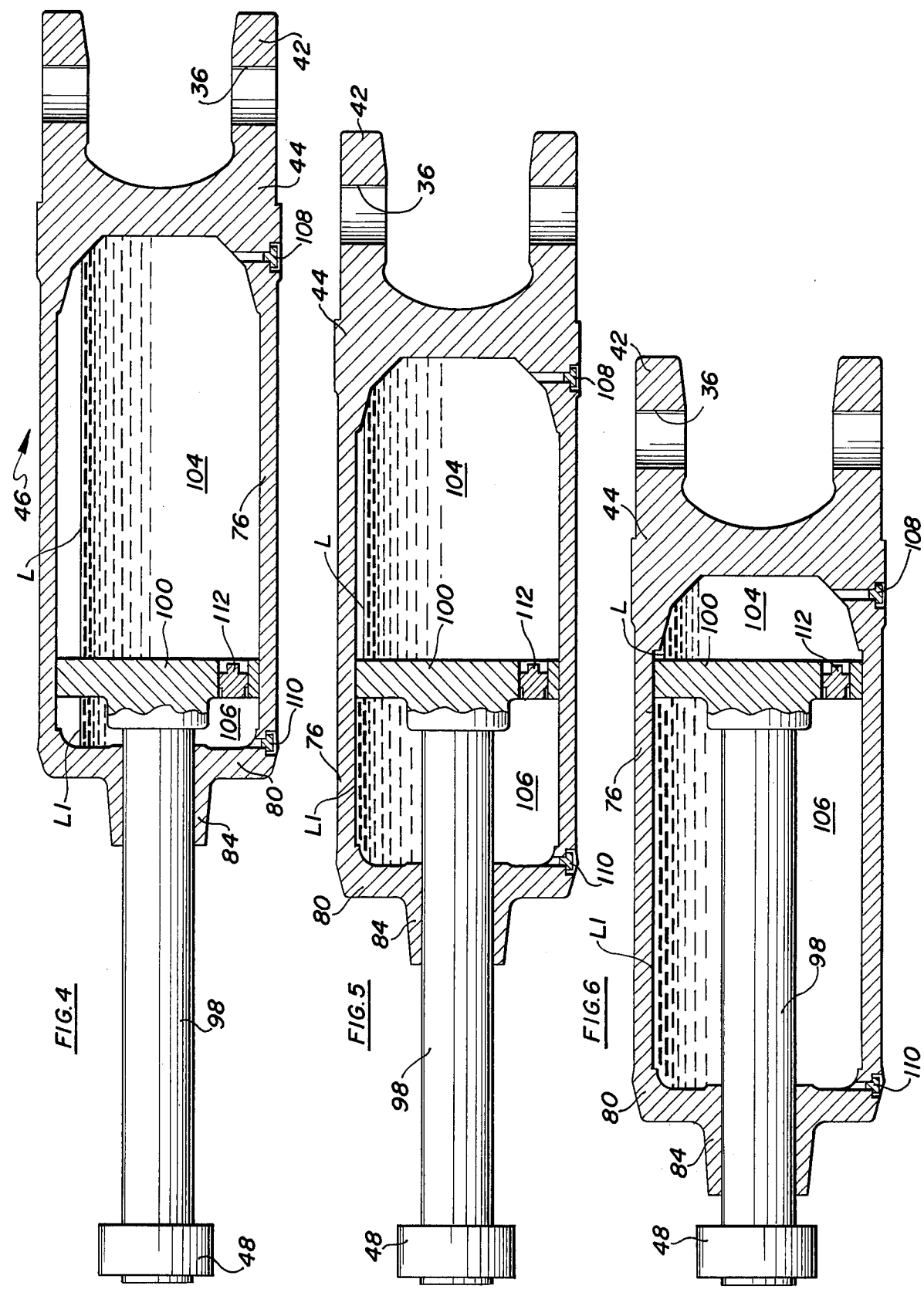

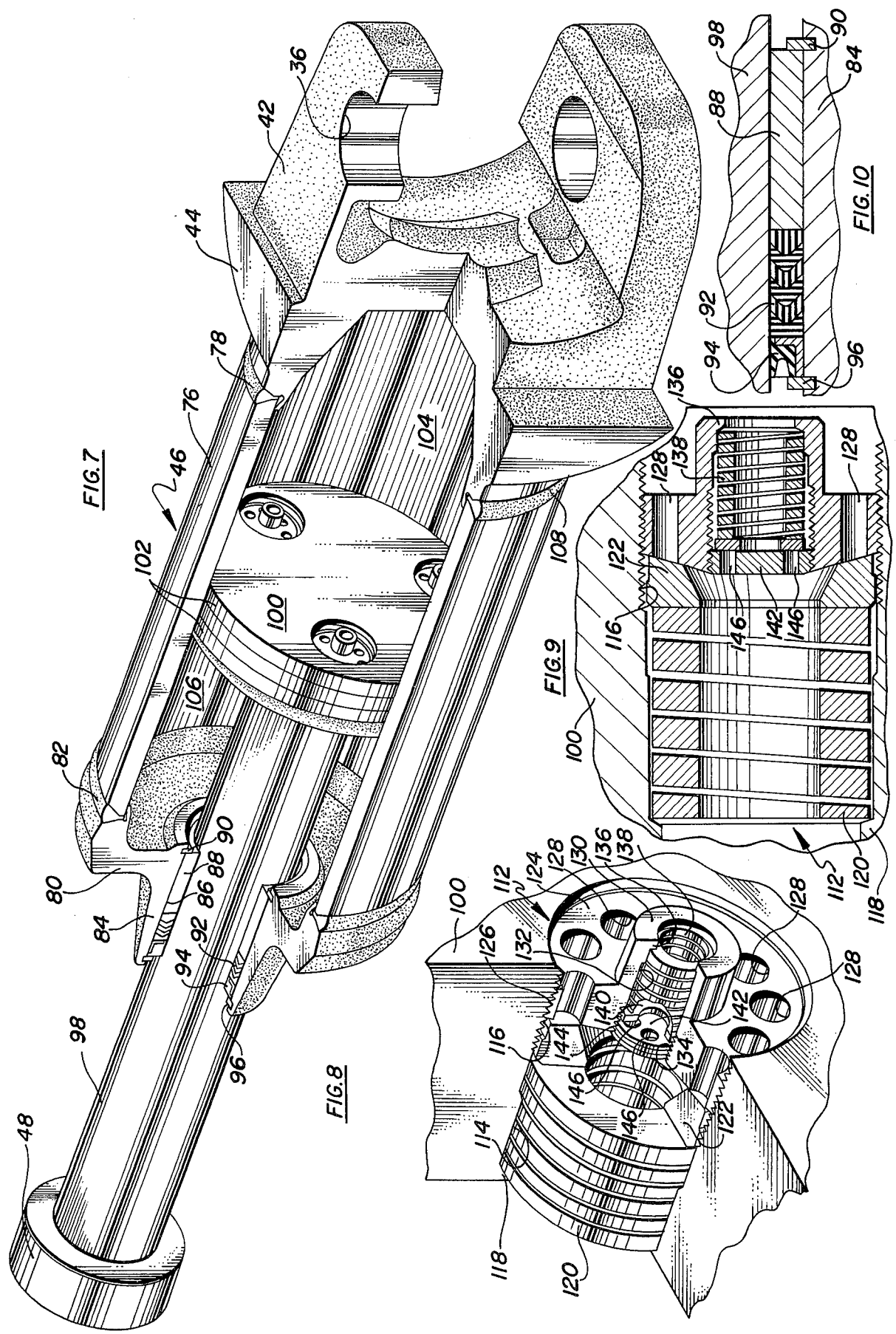

RAILWAY CAR CUSHIONING DEVICE

BACKGROUND OF THE INVENTION

Heretofore, such as shown in U.S. Pat. No. 3,596,774, dated Aug. 3, 1971 and U.S. Pat. No. 3,731,771, dated May 8, 1973, end-of-car dydraulic-pneumatic cushioning devices for railway cars have been provided in which liquid and gas fluids have been in direct contact with each otherin a mixture. However, these prior art devices have provided means to provide at least a partial separation of the gas and liquid fluids. In some instances, a separation air chamber has been connected to a hydraulic fluid by ports and a tubular member has been provided through which the air or gaseous fluid must pass in order to be mixed with the liquid in the high pressure chamber of the cushioning devices. A pre-load pressure of around 200to 600 psi is provided fo the hydraulic cushioning arrangement. An end-of-car cushioning device is usually designed for a speed which provides an impact force of 500 kips or 500,000 pounds. At such impact loads, pressures within the high pressure chamber of te hydraulic-pneumatic cushioning unit having an inside diameter of around 9 inches will be about 8,000 psi which is distributed over the volume of the high pressure chamber. While heretofore it had been expected that the gas escaped to the top of the chamber, this has not been particulaly true as much of the gas has been entrapped in the liquid and has formed a foam in some instances. However, in practice, the gas and liquid mixture or foam has not been found to have any material effect on the operation of the cushioning device.

DESCRIPTION OF THE PRESENT INVENTION

The present invention is directed to a hydraulic-pneumatic cushioning unit adpated to be conncted to a railway car coupler having a piston mounted within a cylinder and a piston rod secured to the piston and extending rearwardly from the cylinder. The high pressure chamber is provided adjacent the coupler and the low pressure chamber in which the piston rod is mounted is provided opposite the coupler end. No attempt is made to separate the gas and liquid in the cushioning device. The piston carriers normally closed valving which upon buff travel opens a buff low passage between the low and high pressure chambers and metering is effected between the high pressure and the low pressure chamber between or through the valving carrid by the piston. Upon draft travel after buff travel, a restricted draft flow passage is opened in the valving between the low and high pressure chambers and the unit is returned to its neutral position. Thus, the metering pin and orifice which has been common in hydraulic-pneumatic cushioning devices heretorfore has been eliminated by the present invention and metering is provided by valving in a carried by the piston which separates the cylinder between high and low pressure chambers.

During operation of the cushioning unit, the gas is entrained within the liquid and, particularly at high velocities, is substantially uniformly mixed. At lower velocities, some foam comprising a mixture of air and liquid will form over the liquid but this is not believed to have any material adverse effect on the operation of the cushioning device.

It is an object of the invention to provide a hydraulic-pneumatic cushioning device in which the gaseous and liquid fluids are in direct contact with each other.

It is another object of the invention to provide a hydraulic-pneumatic end-of-car cushioning device for connection to a railway car coupler in which high pressure and low pressure chambers are formed in a cylinder and fluid metering is effected between the high pressure and low pressure by valving carried by a piston.

It is further object to this invention to eliminate metering of fluid by a metering pin and orifice plate combination in a hydraulic-pneumatic end-of-car cushioning device for railway cars.

BRIEF DESCRIPTION OF THE DRAWINGS

FIG. 1 is a side elevational view of a pair of railway cars coupled to each other;

FIG. 2 is a longitudinal section view of the hydraulic-pneumatic cushioning device comprising the present invention positioned in the center sill of a railway car and connected to a coupler for cushioning impact forces exerted against the coupler;

FIG. 3 is a plan view with certain parts broken away showing the cushioning device shown in FIG. 2 in a compressed position after impact forces have been exerted against the coupler;

FIG. 4 is a sectional view, partially schematic, of the cushioning device illustrated in FIGS. 2 and 3 removed from the railway car and illustrated in a neutral position;

FIG. 5 is a sectional view, partially schematic, similar to FIG. 4 but showing the cushioning device in an intermediate position after impact forces have been exerted FIG. 6 is a sectional view, partially schematic, showing the cushioning device of FIGS. 4 and 5 in a fully compressed position;

FIG. 7 is a perspective view, partly in section, showing the hydraulic-pneumatic cushioning device comprising the present invention removed from the railway car with the unit shown in a partially compressed position;

FIG. 8 is a perspective view, partly in section, showing the valve means carried by the piston of the cushioning unit of FIG. 7 for providing the metering between the high and low pressure chambers of the hydraulic cylinder;

FIG. 9 is a section taken generally along line 9—9 of FIG. 8 and showing the valve means of FIG. 8 in a neutral position with both the buff flow passage and the draft flow passage in closed position;

FIG. 10 is enlarged section of the packing structure around the piston rod of the cushioning device of FIG. 7.

DETAILED DESCRIPTION OF THE INVENTION

Figure 11:
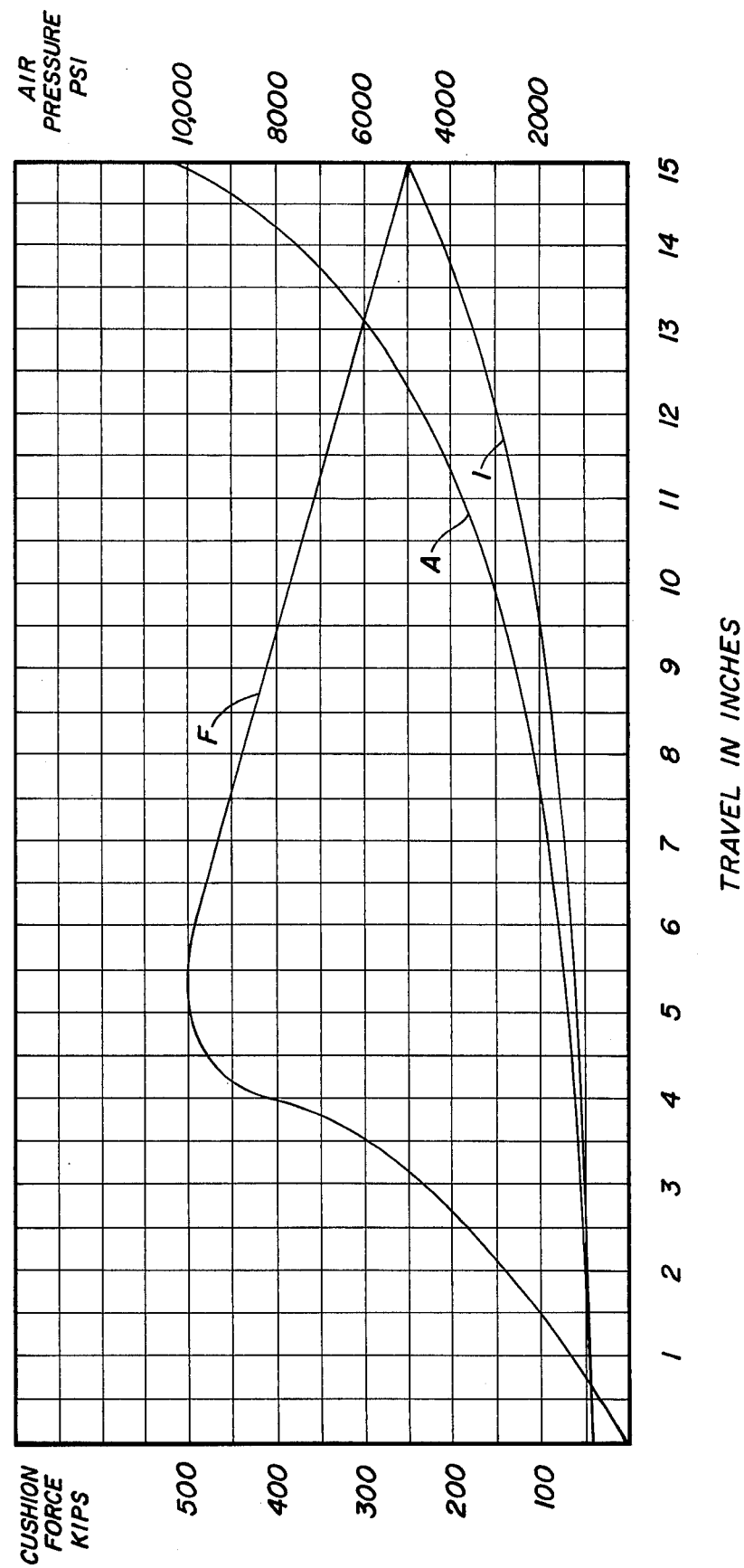
FIG. 11 is a graph showing a force travel curve for the cushioning unit shown in FIGS. 1–10 and additional curves showing the pressure of the compressed gas under travel of the cushioning unit.

Referring now to the drawings for a better understanding of the invention, railway box cars generally indicated at 10 and 12 are inner-connected to each other by couplers 14. A center sill shown at 16 includes spaced sides of webs 18 having lower outwardly extending flanges 20. A top cover plate 22 extends between sides 18 to form a generally hat-shaped center sill 16. The outer end of center sill 16 has outwardly flared side portions 24 and a lower coupler carrier 26 extends flared side portions 24. Front draft lugs 28 are secured to inner surfaces of sides 18 at the juncture of sides 18 with outwardly flared side portions 24. A striker 30 extends between the upper ends of side portions 24.

Coupler 14 includes a coupler head 32 and a coupler shank 34 having a vertical opening 36 therein adapted to receive a pivot pin 40. Coupler 14 is an F-type coupler as designated by the AAR (Association of American Railroads) and is particularly adapted for long length flat cars. It is to be understood that the present invention could be employed with E-type couplers, if desired.

A bifurcated end connection 42 is connected to shank 34 about pivot pin 40 and is formed integrally with an end cap 44 of a hydraulic-pneumatic cushioning unit generally designated at 46. End connection 42 and end cap 44 form one end of hydraulic-pneumatic cushioning unit 46 and the other end is formed by an end collar 48. Mounting cushioning unit 46 within center sill 16 is a lower cover plate 50 which may be removably connected by bolts 52 to flanges 20 of center sill 16. A cutout portion in cover plate 50 forms opening 54 beneath pivot pin 40 and a plate 56 is adapted to fit within opening 54 as shown in FIG. 2. A lower removable plate 58 is bolted by bolts 60 to lower cover plate 50 beneath movable plate 56. For removal of pivot pin 40, plate 58 is first removed to permit removal of plate 56 and pivot pin 40. Cover plate 50 also has an opening 62 to provide access to cushioning unit 46 for inserting fluids within cushioning unit 46 as will be explained further. A backstop casting generally indicated at 64 is welded to sides 18 of center sill 16. Backstop casting 64 provides an abutting face 66 which is in abutting contact with end collar 48 of cushioning unit 46 to receive buff loads. Forming a part of backstop casting 64 are buff limiting stops 70 which contact cushioning unit 46 at the full buff position as shown in FIG. 3 after around 15 inches of travel. A removable adapted 72 is positioned between collar end 48 and flanges 74 of backstop casting 64 to permit a standard backstop casting to be employed with end collar 48. Draft loads are transferred from collar 48 to adapter 72, thence to flanges 74 of backstop casting 64 to center sill 16. Buff loads are transferred directly by backstop casting 64 to center sill 16.

Hydraulic-pneumatic cushioning unit 46 includes a cylinder 76 which is welded at 78 to front end cap 44 as shown in FIG. 7. A rear end cap 80 is welded at 82 to cylinder 76 and has an outwardly extending tubular sleeve 84 with a central opening 86 therethrough. Mounted within opening 86 is a bearing 88 held in position by a retainer ring 90. A packing 92 is positioned adjacent bearing 88 and a wiper 94 is positioned adjacent packing 92. A retainer ring 96 holds wiper 94 in position. A piston rod 98 has end collar 48 on its rear end and is mounted within bearing 88 for reciprocating movement. A piston 100 is secured to the front end of piston rod 98 and has a pair of wear rings 102 mounted about its outer circumference. Piston 100 divides the volume of cylinder 76 into a high pressure chamber 104 and a low pressure chamber 106. An opening 108 to high pressure chamber 104 is provided with a fitting and fluid may also be inserted within cylinder 76 adjacent end cap 44.

A second opening 110 is provided within end cap 80 and a suitable valve arrangement is provided so that air or other inert gas may be inserted within hydraulic cushioning unit 46. Cushioning unit 46 may be recharged through air valve 110 but this is normally accomplished after removal of cushioning unit 46 from the railway car.

Mounted in and carried by piston 100 are a plurality of valves each generally indicated 112. Each valve 112 is identical and in a neutral position as shown in FIGS. 4, 8 and 9, is normally closed. For the purposes of illustration, only one valve 112 is described in detail, it being understood that the remaining valves 112 are identical. Valve 112 fits within an opening 114 extending through piston 100. Internal screw threads 116 are provided adjacent one end of opening 114 and an annular flange 118 extends about the other opposite end of opening 112. Mounted within opening 114 is a coil buff spring 120 fitting against flange 118 and having a center opening therethrough. A buff adapter 122 is mounted adjacent spring 120 and engages the adjacent face of spring 120 to compress spring 120 upon the exertion of buff loads. A buff orifice ring member or plate 124 has external screw threads 126 thereon engaged in threaded relation to internal screw threads 116. A plurality of buff orifices or openings 128 are provided in a circle about ring member 124. Ring member 124 has a generally cylindrical extension 130 an its front face, and a central opening 132 therethrough has internal screw threads 134 adjacent its inner end. An outer annular flange 136 is provided adjacent the outer end of extension 130. Mounted within central opening 132 is a coiled draft spring 138 which abuts flange 136. An annular draft adapter 140 is positioned adjacent spring 138 and a relatively flat draft orifice plate 142 is provided with external screw threads 144 engaging in threaded relation internal screw threads 134. Orifice plate 142 has a plurality of draft orifices or openings 146 arranged in a circle about orifice plate 142. In a neutral position, draft spring 138 urges annular adapter 140 against draft orifice plate 142 to cover openings 146 and thereby prevent the flow of fluid therethrough. Likewise, buff spring 120 in neutral position urges adapter 122 against openings 128 to prevent the flow of fluid therethrough.

Referring particularly to FIGS. 4-6, FIG. 4 shows the cushioning unit 46 in an extended neutral position while FIG. 5 shows the cushioning unit under a buff load after a travel of around 5 inches. FIG. 6 shows cushioning unit 46 in its compressed position after 15 inches of travel under a buff load. In the neutral position of cushioning unit 46 as shown in FIG. 4, high pressure chamber 104 is relatively large in volume to accommodate 15 inches of travel of cylinder 76 while low pressure chamber 106 is relatively small in volume. Hydraulic fluid and a compressible inert gas such as nitrogen is inserted within chambers 104 and 106 through opening 110. A preload pressure of around 500 to 1000 psi is provided in the initial preloading of cushioning unit 46 and in this position, the hydraulic fluid level shown at L in FIG. 4 comprises around 80 to 95 percent of the entire volume of high pressure chamber 104 and low pressure chamber 106. Thus, the gas in neutral position comprises from between 5 to 20 percent of the void volume of chambers 104 and 106. It is desirable to have as small amount of gas as possible as the gas volume is subject to more compressibility than the liquid volume. It is necessary that the volume of gas in the high pressure chamber 104 be adequate to compensate for the volume of space within cylinder 76 occupied by piston rod 98 in the fully compressed position of cushioning unit 46 as shown in FIG. 6.

As an example, piston rod 98 of a diameter of 3½ inches mounted within cylinder 76 of an internal diameter of eleven (11) inches occupies around 8 percent of the total volume of cylinder 72 when it is moved from the position shown in FIG. 4 to the position shown in FIG. 6. Therefore, the gas shown in the void portion of high pressure chamber 104 in FIG. 4 must compensate for the volume occupied by piston rod 98 in the position of FIG. 6 which is around 8 percent of the total volume. When an impact load is exerted against coupler 14 and transmitted to cushion unit 46, the pressure in high pressure chamber 104 immediately is increased and cylinder 76 is moved rearwardly as shown in FIG. 5. Upon the initial impact, the gas is compressed and also dispersed throughout the hydraulic fluid resulting primarily from turbulence and metering of the mixed gas and liquid through metering valves 112. As no attempt is made to separate the gas from the hydraulic fluid, the gas is free to be distributed throughout the volume of hydraulic fluid and piston 100 decreases the volume of high pressure chamber 104 upon rearward travel of cylinder 76. Valves 112 are designed to open at around 2,000 psi at which time adapter 122, exposed to fluid pressure by openings 128, is forced rearwardly against buff spring 120 to compress buff spring 120 and thereof open the relatively large buff orifices or openings 128 to permit the flow of fluid from high pressure chamber 104 to low pressure chamber 106. Upon a high impact force being exerted such as a ten-mile-an-hour impact, cylinder 76 will move between two and three inches before a fluid pressure of around 2,000 psi is reached in high pressure chamber 104 and thus before buff orifices 128 open. Thus, energy is dissipated at low velocities such as occurs during train action, which occurs at low velocities run-ins. This is desirable as many of the end-of-car cushioning devices heretofore have not been designated to provide for any substantial energy dissipation during low velocity run-ins or to provide for normal train which occurs during the normal operation of the train.

During impact, air of gas is dispersed in the hydraulic fluid and when the maximum force of around 500 kips is reached at around 5 inches of travel of cylinder 76, a pressure of around 5,000 psi is reached in high pressure chamber 104. As the fluids pass from high pressure chamber 104 to low pressure chamber 106 through metering valves 112, the metering of gas and liquid to chamber 106 results in a turbulence and a churning of the gas and liquid mixture in low pressure chamber 106 to provide to a large degree a foam of gas and liquid which substantially fills chamber 106 and removes any defined liquid level L1 from chamber 106 as shown in FIG. 5.

FIG. 6 shows cylinder 76 immediately upon impact with rear travel stops 70 at 15 inches of travel and in this position the gas and liquid mixture is well-dispersed with no defined liquid level.

A typical force-travel curve for cushion unit 46 is illustrated in FIG. 11 at F. The data for curve F was obtained from a railway car at a speed of around 11½ mph and a total weight of 220,000 pounds impacted against a test car having the cushion unit 46 therein. As shown in the force travel curve indicated at F, maximum force is reached at around five inches of travel and the forces then dissipate or decrease through the remainder of the 15 inch travel from around 500 kips to around 250 kips at the end of 15 inch travel. At the end of the travel, end cap 80 engages buff travel limiting stops 70 as shown in FIG. 3 and the pressure within high pressure chamber 104 and low pressure chamber 106 is generally equalized at between around 1800 psi to 3,500 psi. In this position, cylinder 76 is returned to its neutral position by the compressed gas within low pressure chamber 106 and by any draft forces exerted by coupler 14 on cushion unit 46 to pull cylinder 76 outwardly. In the return movement of cylinder 76, fluid pressure acting through draft orifices 146 urges adapter 140 against spring 138 to open draft orifices 146 and permit the flow of fluid from chamber 106 to chamber 104. During a return free stroke without any draft load, a pressure differential of around 100 psi exists between chambers 104 and 106 and may, for example be around 1300 psi in chamber 106 and around 1200 psi in chamber 104. Under a high draft force, cylinder 76 is returned with a pressure of around 4,000 psi in chamber 106.

Referring to additional curves illustrated in FIG. 11 which indicates the gas pressure under certain conditions, it has been found that pressure of the gas increases isothermally instead of adiabatically thereby permitting a smaller amount of gas to be employed. If adiabatic conditions existed as shown by the curve indicated at A, a very high gas pressure of over 10,000 psi would be reached at the end of 15 inches of travel which might require the unit to be designed for such high air pressure. However, it has been found that the gas operates at isothermal conditions shown by the curve 1 which results in an air pressure of around 5,000 psi at the end of 15 inches of travel. Thus, it is apparant that a smaller amount of gas can be employed since it has been found that the gas reacts to isothermal conditions instead of adiabatic conditions. This is a result of the air or gas being minutely dispersed in the oil and such small separate gas globules give the gas a very high area of contact with the hydraulic fluid or oil, thereby permitting the heat to be dissipated in a maximum of time. Both curves A and I reflect a maximum design temperature of 120° F. As indicated, a sufficient air volume is required for the displacement of piston rod 98 as it moves within cylinder 76 under buff forces and rod 98 may displace, for example, between 8 and 10 percent of the total volume obtained at the neutral position of cushion unit 46.

Thus, it is understood that the present cushioning device 46 provides an end-of-car cushioning unit which is adequate for high velocity impacts as well as low velocity impacts and this is particularly desirable for train action as it results in the dissipation of energy under very low velocity impacts obtained during normal action.

It is further pointed out that the metering is accomplished without the employment of a metering pin or orifice plate by the use of metering valves which permit a flow of fluid through the piston which divides the cylinder between high pressure chamber 104 and low pressure chamber 106. The gas and liquid mixture being metered through metering valves 112 from high pressure chamber 104 to low pressure chamber 106 results in a churning or turbulence of the fluids in low pressure chamber 106 after passing valves 112 and this substantially fills chamber 106 with a generally uniform mixture particularly with high velocity impacts.

What is claimed is:

1. A hydraulic-pneumatic cushioning unit comprising a cylinder having front and rear end portions, a piston mounted within the cylinder for reciprocal movement, a piston rod secured centrally to a face of the piston and extending through an opening in the rear end portion of the cylinder, said cylinder forming a high pressure chamber adjacent the front face of the piston and a low pressure chamber adjacent the rear face of the piston in which the piston rod is mounted, said high pressure and low pressure chambers having a mixture of gaseous and liquid fluid therein under a preload fluid pressure with the gaseous fluid in the high pressure chamber containing at least 5 percent of the total volume of the high pressure chamber, said piston having an opening therethrough at a position radially spaced from the longitudinal axis of the position rod, and normally closed valve means mounted within said piston opening to control fluid flow between the low pressure chamber and the high pressure chamber and having a relatively large buff flow passage and a restricted draft flow passage, said valve means when moving with the piston in buff travel from extended position remaining closed for at least the initial two inches of buff travel to permit the mixture of gas and liquid in the high pressure chamber to reach a predetermined high value before opening of the buff flow passage for the metering of the mixed gaseous and liquid fluid from the high pressure chamber to the low pressure chamber, said valve means upon return draft travel after buff travel closing the buff flow passage and opening the restricted draft flow passage to permit the metering of the mixed gaseous and liquid fluid from the low pressure chamber to the high pressure chamber and return of the cushioning unit to neutral position.

2. A hydraulic-pneumatic cushioning unit as set forth in claim 1 wherein said piston is generally cylindrical and of a solid cross-section, a buff cover member for the buff flow passage, a buff spring urging the cover member toward the low pressure chamber and a closed position of the buff flow passage, a draft cover member for the draft flow passage, and a draft spring urging the draft cover member toward the high pressure chamber and a closed position of the draft flow passage.

3. A hydraulic-pneumatic cushioning unit as set forth in claim 2 wheren said buff spring is positioned in a concentric relation to said draft spring.

4. A fluid cushioning unit for railway cars comprising:
a cylinder having front and rear end portions, a piston mounted with the cylinder for reciprocal movement, a piston rod secured centrally to a face of the piston and extending through an opening in the rear end portion of the cylinder, said cylinder forming a high pressure chamber adjacent the front face of the piston and a low pressure chamber adjacent the rear face of the piston in which the piston rod is mounted, said piston having at least one opening therethrough between the low pressure and high pressure chambers; and
normally closed valve means mounted within said piston opening to control fluid flow between the low pressure chamber and the high pressure chamber and having a relatively large buff flow passage and a restricted draft flow passage, said valve means comprising a movable buff member covering the buff flow passage and exposed to fluid pressure in the high pressure chamber, a buff spring urging the buff member toward a closed position of the buff flow passage, a movable draft member covering the draft flow passage and exposed to fluid pressure in the low pressure chamber, and a draft spring urging the draft member toward a closed position of the draft flow passage, said draft spring and said buff spring being coiled springs arranged in concentric relation to each other.

5. A cushioning unit as set forth in claim 4 wherein an orifice plate is placed longitudinally between said buff member and said draft member, said orifice plate having the relatively large buff flow passage therein exposing the buff member to fluid pressure from the high pressure chamber and the restricted draft flow passage therein exposing the draft member to fluid pressure from the low pressure chamber.

6. A hydraulic-pneumatic cushioning unit comprising:
a cylinder having front and rear end portions, a piston mounted within the cylinder for reciprocal movement, a piston rod secured centrally to a rear face of the piston and extending through an opening in the rear end portion of the cylinder, said cylinder forming a high pressure chamber adjacent a front face of the piston and a low pressure chamber in which the piston rod is mounted adjacent the rear face of the piston, said high pressure and low pressure chambers having a mixtute of gaseous and liquid fluids therein under a preload fluid pressure with the gaseous fluid in the high pressure chamber containing at least 5 percent of the total volume of the high pressure chamber, said piston having an opening therethrough at a piston radially spaced from the longitudinal axis of the piston rod; and
normally closed valve means mounted within said piston opening to control fluid flow between the low pressure and high pressure chamber, said valve means including a relatively large buff flow passage and a restricted draft flow passage, said valve means when moving with the piston in buff travel from extended position being adapted to remain closed for an initial buff travel of a predetermined distance to permit the mixture of gaseous and liquid fluids in the high pressure chambers to reach a predetermined high value and effect further mixing of the gaseous and liquid fluids before opening of the buff flow passage for the metering of the mixed gaseous and liquid fluids from the high pressure chamber to the low pressure chamber, said valve means upon return draft travel after buff travel closing the buff flow passage and permitting opening of a restricted draft flow passage to permit the metering of the mixed gaseous and liquid fluids from the low pressure chamber to the high pressure chamber and return of the cushioning unit to neutral position.

* * * * *

UNITED STATES PATENT OFFICE
CERTIFICATE OF CORRECTION

Patent No. 4,040,523          Dated August 9, 1977

Inventor(s) Ross G. Carle/James R. Reinhardt

It is certified that error appears in the above-identified patent and that said Letters Patent are hereby corrected as shown below:

Column 1, line 7, change "dydraulic" to -- hydraulic --;
        line 10, change "otherin" to -- other in --; "mixuture" to -- mixture --;
        line 13, change "separation" to -- separate --;
        line 14, after "fluid" insert -- chamber --;
        line 18, change "fo" to -- for --;
        line 19, after "cushioning" insert -- device when employed in an end-of-car cushioning --;
        line 23, change "te" to -- the --;
        line 46, change "carriers" to -- carries --;
        line 47, change "low" to -- flow --;
        line 49, after "pressure" insert -- chamber --;
        line 51, change "carrid" to -- carried --;
        line 58, change "a" to -- and --.
Column 2, line 52, after "is" insert -- an --.
Column 3, line 39, change "adapted" to -- adapter --.
Column 5, line 39, after "train" insert -- action --.
Column 6, line 43, after "neutral" insert -- extended --.
Column 7, line 12, change "position" to -- piston --.
Column 8, line 35, change "piston" to -- position --.

Signed and Sealed this

Thirteenth Day of June 1978

[SEAL]

Attest:

RUTH C. MASON
*Attesting Officer*

DONALD W. BANNER
*Commissioner of Patents and Trademarks*